(12) United States Patent
Batllo et al.

(10) Patent No.: US 10,934,173 B2
(45) Date of Patent: *Mar. 2, 2021

(54) HIGHLY HOMOGENOUS ZEOLITE PRECURSORS

(71) Applicant: ECOLAB USA INC., St. Paul, MN (US)

(72) Inventors: Francois Batllo, Burr Ridge, IL (US); Wenyong Lin, Rolling Meadows, IL (US); Yulia Tataurova, Naperville, IL (US); George Salomon, Chicago, IL (US); Shiby John, Aurora, IL (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/999,385

(22) Filed: Aug. 21, 2020

(65) Prior Publication Data
US 2020/0377374 A1    Dec. 3, 2020

Related U.S. Application Data

(63) Continuation of application No. 16/530,106, filed on Aug. 2, 2019, now Pat. No. 10,773,967, which is a continuation of application No. 15/334,679, filed on Oct. 26, 2016, now Pat. No. 10,399,859.

(60) Provisional application No. 62/246,486, filed on Oct. 26, 2015.

(51) Int. Cl.
| | |
|---|---|
| *C01B 39/48* | (2006.01) |
| *B01J 29/06* | (2006.01) |
| *B01J 37/00* | (2006.01) |
| *C01B 39/04* | (2006.01) |

(52) U.S. Cl.
CPC .............. *C01B 39/48* (2013.01); *B01J 29/06* (2013.01); *B01J 37/0072* (2013.01); *C01B 39/04* (2013.01)

(58) Field of Classification Search
CPC .......... C01B 39/04; C01B 39/48; B01J 29/06; B01J 37/0072
See application file for complete search history.

(56) References Cited

U.S. PATENT DOCUMENTS

| | | | |
|---|---|---|---|
| 3,014,055 A | 12/1961 | Johnson et al. | |
| 3,252,917 A | 5/1966 | Mindick et al. | |
| 3,655,329 A | 4/1972 | Shih et al. | |

(Continued)

FOREIGN PATENT DOCUMENTS

| | | |
|---|---|---|
| EP | 1609759 A1 | 12/2005 |
| JP | H10-505817 | 6/1998 |

(Continued)

OTHER PUBLICATIONS

International Search Report dated Jan. 26, 2017 for International application No. PCT/US2016/058839, 6 pages.

(Continued)

*Primary Examiner* — David M Brunsman
(74) *Attorney, Agent, or Firm* — Kagan Binder, PLLC

(57) ABSTRACT

The invention provides methods and compositions for precursors and for the synthesis of zeolites. The invention makes use of intimately homogeneous precursors which avoid the formation of a difficult to work with gel stage in zeolite formation. This allows for the synthesis of zeolite in a much shorter period of time and with much lower amounts of structure directing agents.

15 Claims, 4 Drawing Sheets

(56) References Cited

U.S. PATENT DOCUMENTS

| | | | |
|---|---|---|---|
| 3,745,136 | A | 7/1973 | Moore, Jr. |
| 3,864,142 | A | 2/1975 | Kovarik |
| 3,957,598 | A | 5/1976 | Merkl |
| 4,327,032 | A | 4/1982 | Lohse et al. |
| 5,026,532 | A | 6/1991 | Gaffney et al. |
| 5,233,065 | A | 8/1993 | Sharif |
| 5,558,851 | A | 9/1996 | Miller |
| 5,863,516 | A | 1/1999 | Otterstedt et al. |
| 5,883,035 | A | 3/1999 | Yang |
| 6,022,471 | A | 2/2000 | Wachter et al. |
| 6,218,329 | B1 | 4/2001 | Singh et al. |
| 6,498,262 | B2 | 12/2002 | Jerome et al. |
| 6,585,952 | B1 | 7/2003 | Pinnavaia et al. |
| RE40,299 | E | 5/2008 | Bruinsma et al. |
| 8,106,229 | B2 | 1/2012 | Holland et al. |
| 8,658,127 | B2 | 2/2014 | Holland |
| 8,845,991 | B2 | 9/2014 | Keiser et al. |
| 8,883,119 | B2 | 11/2014 | Bull et al. |
| 9,108,190 | B1 | 8/2015 | Fan et al. |
| 10,399,859 | B2 * | 9/2019 | Batllo ................. B01J 37/0072 |
| 2003/0091872 | A1 | 5/2003 | Yan |
| 2005/0234136 | A1 | 10/2005 | Holland et al. |
| 2006/0140854 | A1 | 6/2006 | Juttu et al. |
| 2007/0104643 | A1 | 5/2007 | Holland |
| 2007/0231249 | A1 | 10/2007 | Batllo et al. |
| 2008/0118431 | A1 | 5/2008 | Vermeiren et al. |
| 2008/0293987 | A1 | 11/2008 | Khanmamedova et al. |
| 2011/0054232 | A1 | 3/2011 | Sangar et al. |
| 2012/0004486 | A1 | 1/2012 | Lewis et al. |
| 2012/0123138 | A1 | 5/2012 | Ganhy et al. |
| 2013/0052125 | A1 | 2/2013 | Moini et al. |
| 2014/0147378 | A1 | 5/2014 | Davis et al. |
| 2014/0241981 | A1 | 8/2014 | Dutta et al. |
| 2014/0263170 | A1 | 9/2014 | Long et al. |
| 2015/0190792 | A1 | 7/2015 | Muraza et al. |
| 2015/0218007 | A1 | 8/2015 | Chen et al. |
| 2015/0343375 | A1 | 12/2015 | Moini et al. |
| 2015/0360964 | A1 | 12/2015 | Rimer et al. |
| 2016/0101415 | A1 | 4/2016 | Ji et al. |
| 2020/0079655 | A1 * | 3/2020 | Batllo ..................... C01B 39/48 |

FOREIGN PATENT DOCUMENTS

| | | |
|---|---|---|
| WO | 94/26663 A1 | 11/1994 |
| WO | 97/03019 A1 | 1/1997 |
| WO | 2006103092 A1 | 10/2006 |
| WO | 2008/060768 A2 | 5/2008 |
| WO | 2015/042094 A1 | 3/2015 |

OTHER PUBLICATIONS

Written Opinion dated Jan. 26, 2017 for International application No. PCT/US2016/058839, 6 pages.

Robin Harris et al., "NMR Nomenclature. Nuclear Spin Properties and Conventions for Chemical Shifts," Pure Applied Chemistry, vol. 73, No. 11, pp. 1795-1818 (2001).

Ralph K. Iller, "The Chemistry of Silica: Solubility, Polymerization, Colloid and Surface Properties and Biochemistry of Silica," John Wiley and Sons, Inc., pp. 312-599 (1979).

Ramanath N. Bhat, et al. "Synthesis of Zeolite Beta Using Silica Gel as a Source of SiO2" Journal of Chem. Tech. and Biotech, vol. 48, pp. 453-466 (1990).

Cundy et al. "The hydrothermal synthesis of zeolite: Precursors, intermediates and reaction mechanism", Microporous and Mesoporous Materials, vol. 82, Issues 1-2, pp. 1-78 (2005).

Bi et al, "Studies on the mechanism of hydrolysis and polymerization of aluminum salts in aqueous solution: correlations between the "Core-links" model and "Cage-like" Keggin Al(subscript 13) model", Coordination Chemistry Reviews, vol. 248, Issues 5-6, pp. 441-445, (2004).

Mintova et al., "Formation of colloidal molecular sieves: influences of silica precursor," Colloids and Surfaces A: Physicochem. Eng. Aspects vol. 207, pp. 153-157, (2003).

Mohamed et al., "Effects of the silica sources on the crystallinity of nanosized ZSM-5 zeolite," Microporous and Mesoporous Materials, vol. 79, pp. 7-12, (2005).

"Verified Synthesis of Zeolitic Materials", Second Revised Edition, Elsevier, 2001, 177 pages.

Alipour et al., "Effects of the different synthetic parameters on the crystallinity and crystal size of nanosized ZSM-5 zeolite", Rev. Chem. Eng., vol. 30, No. 3, 2014, pp. 289-322.

Extended European Search Report for European Application No. 16860674.7, dated May 6, 2019, 12 pages.

International Search Report for International Application No. PCT/US2017/063965, dated Feb. 6, 2018, 6 pages.

Written Opinion for International Application No. PCT/US2017/063965, dated Feb. 6, 2018, 10 pages.

Teagarden et al.,"Conversion of aluminum chlorohydrate to aluminum hydroxide", Journal of the Society of Cosmetic Chemists, vol. 33, pp. 281-295, Sep./Oct. 1982.

Office Action in Japanese Patent Application No. 2018-520433, dated Nov. 10, 2020, 8 pages (4 pages of English Translation & 4 pages of Official Copy).

* cited by examiner

HIGHLY HOMOGENOUS ZEOLITE PRECURSORS

BACKGROUND OF THE INVENTION

The invention relates to compositions, methods, and apparatuses for improving the manufacture of zeolites. In particular it relates to compositions and their use as precursors to zeolite manufacture.

Zeolites are microporous, metalosilicate (especially aluminosilicate) minerals commonly used as commercial adsorbents and catalysts. While Zeolites occur naturally they are also produced industrially on a large scale. Zeolite mineral is characterized as microporous because their constituent silicon, oxygen, and metal/aluminum atoms are arranged into various possible ring configurations which are positioned in a series such that the series of rings define channels passing through the mineral. The specific number and ratio of types of atoms in a given ring determines the width of the channels. As a result, different numbered rings can result in channel width which varies such that they are capable of accommodating only one or some of specific ions/cations such as one or more of $Na^+$, $K^+$, $Ca^{2+}$, $Mg^{2+}$ and others. As a result zeolites are often used as and referred to as molecular sieves.

Because of their unique structure and their ion-specific affinity, zeolites possess a number of properties that are desirable for a wide range of industrial and commercial uses. Such uses include but are not limited to: ion-exchange beds, water purification, water softening, catalysts, sorbents, gas separation, oxygen gas generation, petrochemical catalysts, Lewis acid catalysts, catalytic cracking catalysts, nuclear-radioactive material substrates, hygroscopic heat absorbers, detergents, asphalt-concrete substrates, gemstones, blood clotting agents, potassium releasing fertilizer, agricultural water releasing agents, and aquarium filters.

Unfortunately naturally occurring zeolites do not have channels of uniform size, orientation, or shape, and the channels are often contaminated by other unwanted minerals, metals, quartz, or other zeolites. As a result, there is clear utility in novel techniques of zeolite synthesis and precursors thereof that facilitate the specific properties most beneficial to a specific uses of zeolite.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 CFR § 1.56(a) exists.

BRIEF SUMMARY OF THE INVENTION

To satisfy the long-felt but unsolved needs identified above, at least one embodiment of the invention is directed towards a method of forming zeolites. The method comprises the steps of modifying a colloidal silica sol with a metal compound and in the presence of an SDA to a temperature of at least 100° C. for a time period of at least 0.1 hours and no more than 10 hours.

The metal may be one item selected from the group consisting of: an alkali metal, an alkaline earth metal, a 1st row transition metal, a 2nd row transition metal, a lanthanide, aluminum, cerium, titanium, tin, zirconium, zinc, copper, nickel, molybdenum, iron, rhenium, vanadium, boron, and any combination thereof. The SDA may be one item selected from the group consisting of: tetramethylammonium hydroxide, tetrapropylammonium hydroxide, tetraethylammonium hydroxide, tetrabutylammonium hydroxide, tetrahexylammonium hydroxide, tetraoctylammonium hydroxide, tributylmethylammonium hydroxide, triethylmethylammonium hydroxide, trimethylphenylammonium hydroxide, methyltripropylammonium hydroxide, dodecyltrimethylammonium hydroxide, hexadecyltrimethylammonium hydroxide, dimethyldodecylethylammonium hydroxide, diethyldimethylammonium hydroxide, and any combination thereof. The SDA may be in the form of one item selected from the group consisting of: a bromide, a chloride, an ammonium salt, a alkylammonium hydroxide, and any combination thereof. The colloid may have an S-Value which is at least 20% lower than if the same amount of silica and metal were present in a non-doped form. The colloidal silica is modified by incorporating the metal in the framework or on the surface of the silica. The doped metal may be a coating at least in part surrounding a droplet of the colloidal silica. The time period may be no more than 4 hours and the crystallinity is in excess of 80%. The resulting zeolite may have a higher crystallinity than an otherwise identical process differing only in that the metal and silicon were in a non-modified form. The resulting zeolite may have a higher crystallinity than an otherwise identical process differing only in that at least 10% more SDA was used. The modification of colloidal silica may occur at a temperature of 70-90 C and the metal and silicon were in a non-modified form. The resulting zeolite may have a higher crystallinity than an otherwise identical process differing only in that the metal and silicon were in a non-colloidal form.

Additional features and advantages are described herein, and will be apparent from, the following Detailed Description.

BRIEF DESCRIPTION OF THE DRAWINGS

A detailed description of the invention is hereafter described with specific reference being made to the drawings in which.

For the purposes of this disclosure, like reference numerals in the figures shall refer to like features unless otherwise indicated. The drawings are only an exemplification of the principles of the invention and are not intended to limit the invention to the particular embodiments illustrated.

DETAILED DESCRIPTION OF THE INVENTION

Figure 1:
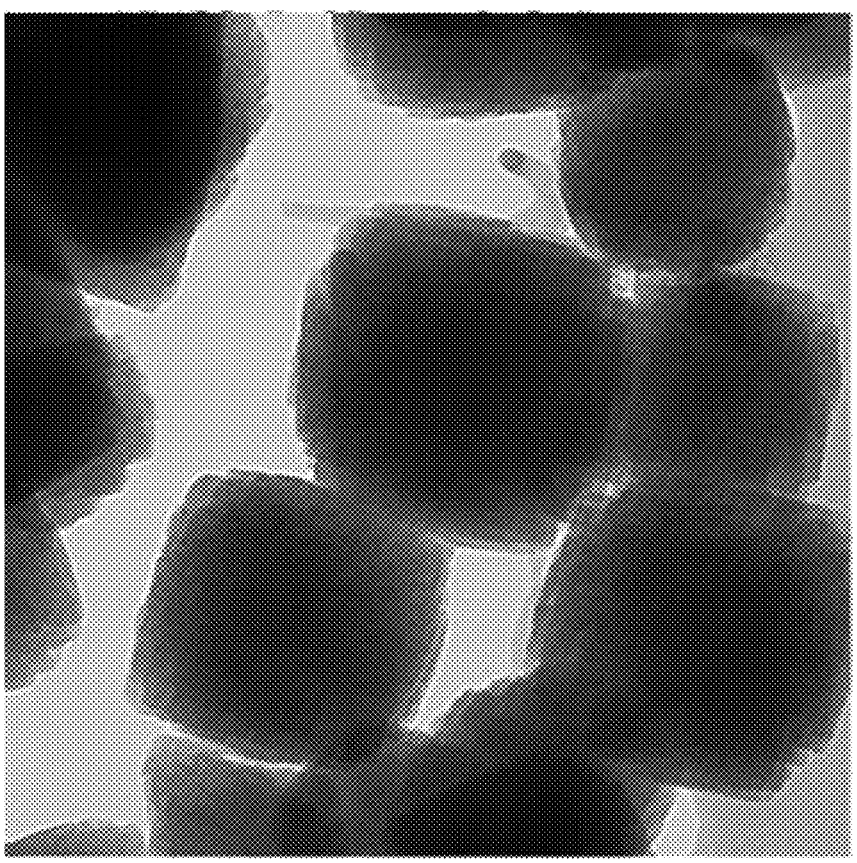
FIG. 1 is an electron microscope (SEM) photograph of a beta type zeolite crystal formed from modified precursors in a relatively short period of time with a relatively low level of SDA.
Figure 2:
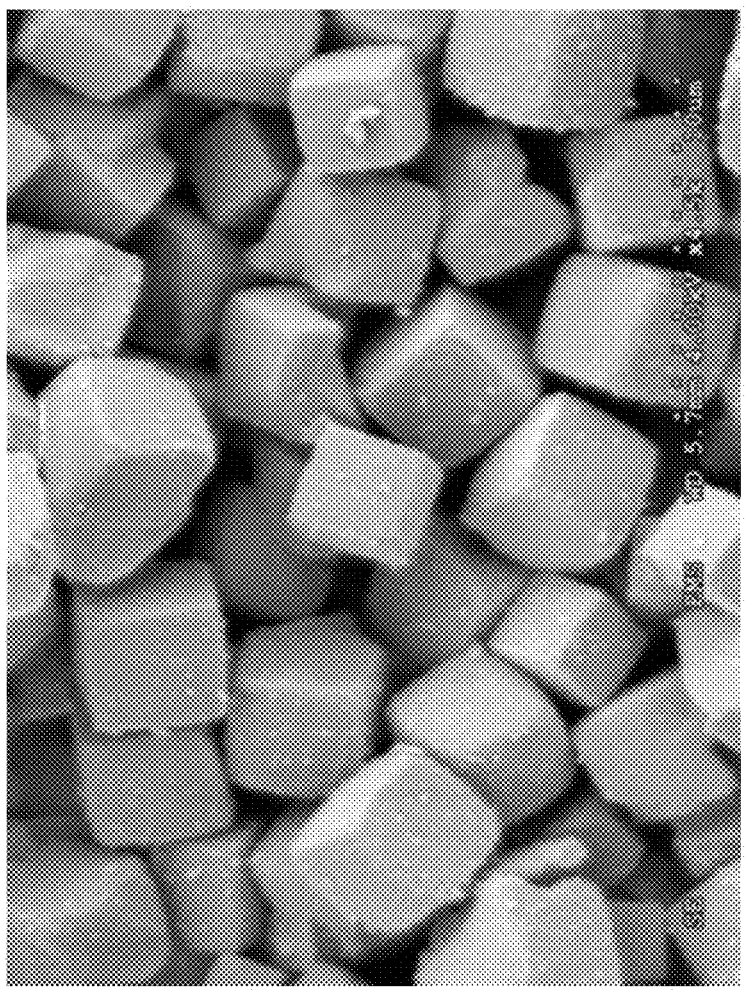
FIG. 2 is an electron microscope (SEM) photograph of a chabazite type zeolite crystal formed from modified precursors in a relatively short period of time with a relatively low level of SDA.

The following definitions are provided to determine how terms used in this application, and in particular how the claims, are to be construed. The organization of the definitions is for convenience only and is not intended to limit any of the definitions to any particular category.

"Chemical Shift" also referred to as δ, means the variation of resonant frequency of a nucleus relative to a standard in a magnetic field which functions as a diagnostic of the structure of a composition of matter containing that nucleus, it is a function of properties of the nucleus including: magnetic moment (nuclear spin), local magnetic fields induced by currents of electrons in the molecular orbitals, and local geometry (binding partners, bond lengths, angles between bonds), it is more further described in the article *NMR Nomenclature. Nuclear Spin Properties and Conventions for Chemical Shifts* by Robin Harris et al, Pure Applied Chemistry Vol. 73 No. 11, pp. 1795-1818 (2001), and the reference: 5.2 *Chemical Shift*, by Hans J. Reich, University of Wisconsin. Web. October, 20 (2015), <http://www.chem.wisc.edu/ereas/reich/nmr/05-hmr-02-delta.htm>, unless otherwise stated in this application a measured chemical shift is referenced to the measured signal of tetramethylsilane.

"SAR" means silica to aluminum ratio it includes the ratio between alumina and silica molecules.

"SDA" means structure directing agent, a material which positions the constituent Si and Al atoms of a zeolite precursor to assume a specific desired configuration, usually a particular sized/shaped ring arrangement, ideally SDA's are also easy to remove from the resulting zeolite formation.

"Colloid" or "Colloidal System" means a substance containing ultra-small particles substantially evenly dispersed throughout another substance, the colloid consists of two separate phases: a dispersed phase (or sol or internal phase) and a continuous phase (or dispersion medium) within which the dispersed phase particles are dispersed, the dispersed phase particles may be solid, liquid, or gas, the dispersed-phase particles have a diameter of between approximately 1 and 1,000,000 nanometers, the dispersed-phase particles or droplets are affected largely by the surface chemistry present in the colloid, thus a colloid encompasses both the dispersed phase and the continuous phase.

"Stable" means that the solid phase of the colloid is present, dispersed throughout the medium, and stable throughout this entire pH range with effectively no precipitate.

"Modifying" or "Modified Precursors" refers to a process of physically contacting a silicon bearing material such as silicic acid or colloidal silica with one or more molecules of a metal component dispersed at least in part within or around the framework of a colloidal silica sol, it may include doping sols with the metal component.

"Heel" refers to an aqueous basic solution in the doping process that may at least includes a quaternary amine or an alkaline agent.

"Colloidal Silica" means a colloid in which the primary dispersed-phase particles comprise silicon containing molecules, this definition includes the full teachings of the reference book: *The Chemistry of Silica: Solubility, Polymerization, Colloid and Surface Properties and Biochemistry of Silica*, by Ralph K. Iler, John Wiley and Sons, Inc., (1979) (hereinafter "*Chemistry-Silica*") generally and also in particular pages 312-599, in general when the particles have a diameter of above 100 nm they are referred to as sols, aquasols, or nanoparticles.

"Consisting Essentially of" means that the methods and compositions may include additional steps, components, ingredients or the like, but only if the additional steps, components and/or ingredients do not materially alter the basic and novel characteristics of the claimed methods and compositions.

"Droplet" means a mass of dispersed phase matter surrounded by continuous phase liquid, it may be suspended solid or a dispersed liquid.

"Microparticle" means a dispersed-phase particle of a colloidal system, generally microparticle refers to particles that have a diameter of between 1 nm and 100 nm which are too small to see by the naked eye because they are smaller than the wavelength of visible light.

"Particle Size" means the surface area of a single droplet.

"S-Value" means the measure of the degree of microaggregation of colloidal materials, it can be obtained from measurements of viscosity of the colloidal system and is often related to the performance of the colloidal end product, its exact metes and bounds and protocols for measuring it are elucidated in the book Chemistry-Silica.

"Silanol" means a functional group on a silicon bearing molecule with the connectivity of Si—O—H.

"Solids %" means the portion of an aqueous system by weight that is silica bearing particles of the continuous phase.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the *Kirk-Othmer Encyclopedia of Chemical Technology*, 5th Edition, (2005), (Published by Wiley, John & Sons, Inc.) this definition shall control how the term is to be defined in the claims. All illustrated chemical structures also include all possible stereoisomer alternatives.

At least one embodiment of the invention is directed towards modified zeolite precursors and a method of producing zeolite from such precursors. The modified precursors are characterized as having a highly homogeneous distribution of constituents such that specific zeolites can be formed in relatively short periods of time.

As described in US Patent Application 2013/0052125 and 2005/0234136, and U.S. Pat. Nos. 8,106,229, 8,845,991, 5,026,532, 5,863,516, 8,658,127, zeolite can be synthesized through the combination and nucleation (potentially under heating) of precursors including: a silica source, an alumina source, and a structure directing agent. Unfortunately all of these prior art methods result in an undesirable tradeoff, they either require the use of long reaction times or they result in low crystalline rates. In particular U.S. Pat. No. 8,658,127 describes a method of preparing zeolite material comprised aggregating particles into mesoporous agglomerates thereby reducing the homogenous nature of the colloidal system and adding reaction time. The scientific paper *Synthesis of Zeolite Beta Using Silica Gel as a Source of SiO2*, by RN Bhat et al., Journal of Chem. Tech. And Biotech., Vol. 48, pp. 453-466 (1990) demonstrates that reaction times of: 4, 5, 6, and 8 days resulted in crystallinity values of 20%, 30%, 60% and 100% respectively for zeolites having a specific desired SAR.

In contrast the use of modified precursors in zeolite synthesis produces high crystallinity values in short reaction times. While the exact process of zeolite formation from precursors is not precisely understood, the scientific paper *The hydrothermal synthesis of zeolite: Precursors, intermediates and reaction mechanism*, by CS Cundy et al, Microporous and Mesoporous Materials, Vol. 82, pp. 1-78 (2005) explains that the prior art methods involve a process including a randomly arranged amorphous gel transitioning into an increasingly ordered equilibrated gel which when it becomes orderly enough undergoes nucleation into crystalline zeolite. Without being limited by a particular theory or design of the invention or of the scope afforded in construing the claims, it is believed that the prenucleation arrangments of modified precursors allows the precursors to vastly increase the reaction kinetics and initiate nucleation without much or any need to first aggregate, agglomerate or properly order themselves thus drastically reducing the required crystallization time.

In at least one embodiment the nucleation is performed according to any one or any combination of methods described in any one, some, or all, of the prior art cited herein and incorporated by reference into this application, improved by the addition of an arrangement of modified precursors.

In at least one embodiment the arrangement of modified precursors is achieved through the use of metal (such as aluminum) doped colloidal silica sols. The method can include preparing a silicic acid and mixing a known proportion of the metal oxide dispersion to form a silica and aluminum percursors. Subsequently, combining the metal modified silicic acid and the basic heel solution at room temperature forms one or more colloidal silica-modified metal oxide particles. In a metal modified colloidal silica sol the zeolite precursors are highly and evenly distributed throughout a solvent. In US 2013/0052125, this combination is performed at temperatures ranging from 70-90 C resulting in a segregation of aluminum in the form of Aluminum hydroxide. Moreover, because specific zeolite properties are highly dependent on the ratio of alumina to silica and in particular to the various atomic coordination that the proportions of the two (as well as oxygen) facilitate, pre-bonding aluminum in the silica network allows for the rapid formation of zeolite species that are otherwise difficult or possibly impossible to form if subject to the slow prior art kinetics. In addition, modifying colloidal silica results in some of the Silicon-Oxygen-Aluminum bonds pre-existing the reaction process giving the overall reaction a time saving head-start.

In another embodiment the homogenous arrangement of precursors is achieved through the use of aluminum coated silica sols. Colloidal silica, for example, has been coated with various metallic compounds as disclosed in U.S. Pat. Nos. 3,252,917, 3,745,126, and also in the book Chemistry-Silica (generally and in particular pages 410-411). Coated colloidal silica allows for pre-bonding the aluminum precursors on the surface of colloidal particles dispersed in an aqueous medium while keeping the silicon molecules bound with each other. This arrangement of precursors favors crystallization kinetics of zeolites where aluminum is a limiting reactant or silicon is released slowly.

In both previous embodiments, it is believed that the pre-bonded, non-agglomerated nature of the colloidal precursors provides for an added homogeneity conducive to faster zeolite crystallization kinetics.

The use of metal (such as aluminum) modified colloidal silica as a means of increasing reaction kinetics in an unexpected result which is opposite the teachings of the prior art. The prior art teaches to start with a "clear" solution containing one or the other of the silica or aluminum and to add the other slowly in a gradual drop-wise manner lest a viscous agglomerated gel result that would greatly slow down/impair the zeolite formation (See Scientific Papers *Formation of colloidal molecular sieves: influences of silica precursor*, by S Mintova et al, Colloids and Surfaces, Vol. 207 pp. 153-157 (2003)) and *Effects of the silica sources on the crystallinity of nanosized ZSM-5 zeolite*, by RM Mohamed et al, Microporous and Mesoporous Materials, Vol. 79, pp. 7-12 (2005). In contrast the invention accomplishes the rapid reaction kinetics by dosing much or all of the precursors at once or in a controlled manner, the exact opposite of the teachings of the prior art.

In at least one embodiment the modification of colloidal silica is characterized as the metal (such as aluminum) molecules being embedded within the silica network of the sol.

In at least one embodiment the modification of colloidal silica is characterized as the metal (such as aluminum) molecules forming bonds with silicon at the outer surface of the particles. This may result in a partial or complete enclosing of the metal particles.

In at least one embodiment the resulting zeolite achieves a crystallinity value of between 75% and 100% within a time period of no more than 4 hours (preferably no more than 3 hours) or even less or more.

In at least one embodiment the modified colloidal silica results in the same crystalline properties as a non-modified precursor that makes use of at least 10% more SDA.

In at least one embodiment the silica precursor is in the form of colloidal particles or molecular silicic acid. Representative silicic acid may be created by deionization of Na-silicate with a cationic resin. Silicic acid is the general name for a family of chemical compounds containing the element silicon attached to oxide and hydroxyl groups. This family of compounds have the general formula $[SiO_x(OH)_{4-2x}]_n$. Colloidal particles may be synthesized by adding a silicic acid solution to a reaction vessel that includes an alkaline aqueous heel solution. Upon addition in the heel, the silicic acid polymerizes, $SiO_2$ nucleate and silica particles grow in the solution. The growth rate and final size depends on the feed rate, pH and temperature of polymerization.

In at least one embodiment the colloidal silica is modified with aluminum and/or one or more other metal compounds. The metal compound may be an aqueous metal compound. The metal may include any suitable material and be derived from any suitable material including metal salts that are soluble or substantially soluble in an aqueous solution. The metal may include an alkali metal, an alkaline earth metal, a 1st row transition metal, a 2nd row transition metal, a lanthanide, an actinide, and combinations thereof. Preferred metal components include but are not limited to one or more of: aluminum, cerium, titanium, tin, zirconium, zinc, copper, nickel, molybdenum, iron, rhenium, vanadium, boron, the like and any combination thereof.

In at least one embodiment the precursor may result in part between contact between silica and a metal salt. The cationic (or when appropriate other) portions of such a salt may comprise one or more of an: acetate, carbonate, chloride, bromide, iodide, citrate, cyanide, fluoride, nitrate, nitrite, phosphate, phosphoric acid, sulfate, nitride, nitrite, chlorate, perchlorate, sulfide, borate, chromate, phosphide, sulfite, bromate, hydroxide, ammonium, and any combination thereof.

The metal compound may be added to the silicic acid prior to the polymerization reaction, co-fed with the silicic acid into the aqueous alkaline heel or added to the heel prior to feeding the silicic acid. During particle formation, the OFF present in the heel catalyzes the copolymerization of the cationic metal component and silicate ($SiO^{4-}$) from the silicic acid. This produces a colloid with the metal dispersed within the silicate (i.e., incorporated into the particle framework), such as having a homogenous distribution of the metal component throughout the entire solid phase of the precursors. It is believed that the dispersion and loading of the metal is obtained as the copolymerization forms a metal-silicate lattice throughout the microstructure of the solid phase. Alternatively, the metal compound can be added onto the surface of colloidal silica particles. The process for making the modified composition comprises intimately and homogeneously coating the metal compound onto the surface of the colloidal amorphous silica so as to establish a stable chemical bond between the metal compound and the silica. This can be done by preparing a colloidal dispersion of silica and contacting this dispersion simultaneously with a solution containing a soluble source of the metal ion. For example, a silica sol having a concentration between 5% and 40% $SiO_2$ can be coated with a metal compound by slowly adding a soluble compound of the metal under constant agitation. This process can be continued for as long a period of time as is required to build up the desired SAR as a coating on the colloidal amorphous silica sols.

Figure 3:
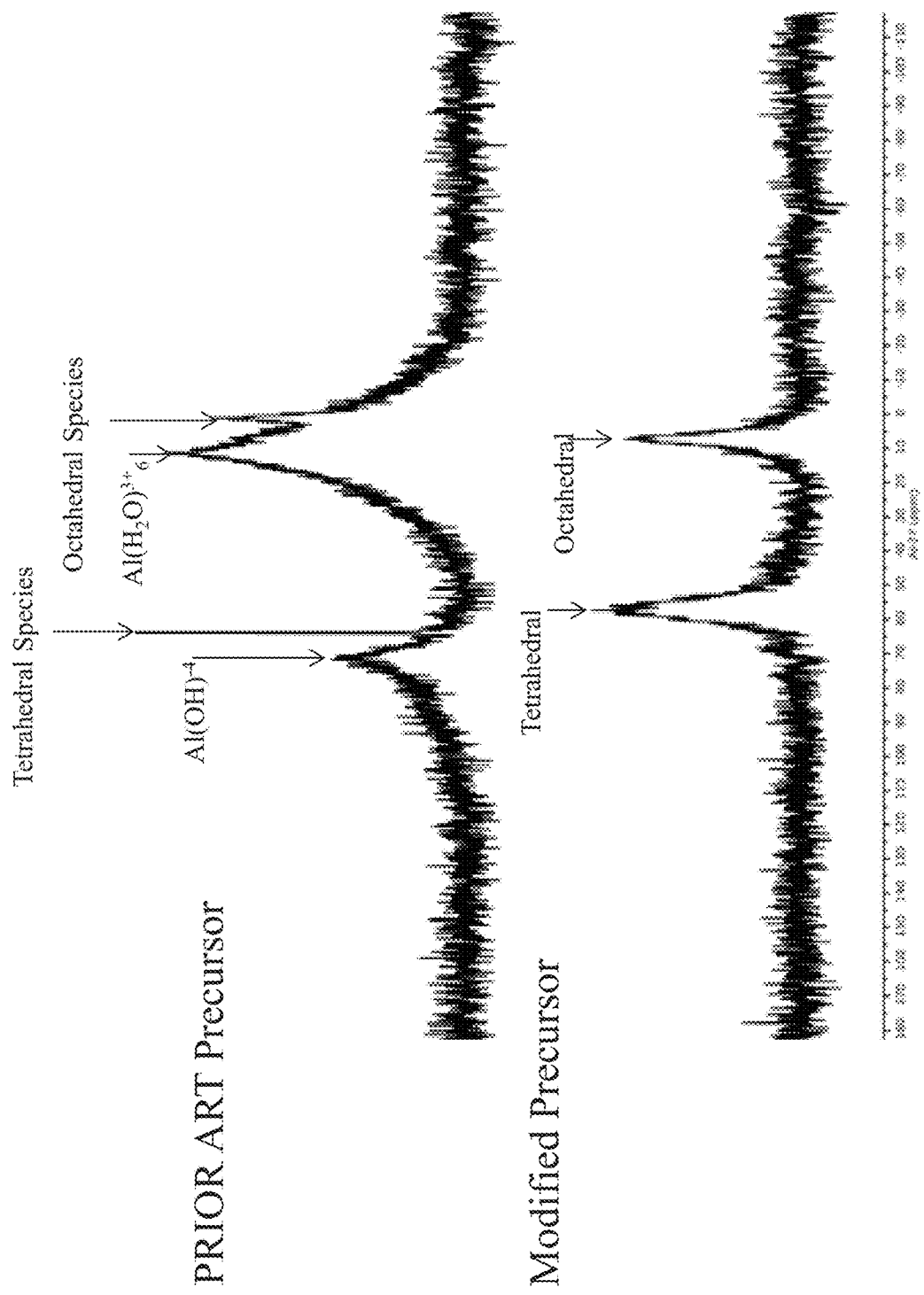
FIG. 3 is an NMR spectrum of the modified silica precursors indicating that the Al species in the precursor are mainly in a tetrahedral and octahedral coordination.

Referring now to FIG. 3 it is shows that a comparison of NMR spectra between the prior art precursors and the modified precursors display different properties. While FIG. 3 specifically displays an aluminum-using precursor, this is merely representative and it is understood that the principle equally applies to other metals as well. The prior art precursor comprises a variety of spectra signals for many different species of metal (alumina) such as $Al(OH)^{-4}$ and $Al(H_2O)^{+3}_6$ as well as the tetrahedral and octahedral components of Keggin-type $Al_{13}O_4(OH)^{3+}_{28}$. In contrast the modified precursor is largely limited to tetrahedral and octahedral species. In at least one embodiment no less than an amount of up to, equal, or more than 90% of the metal species in the colloidal system is in the form of a tetrahedral or octahedral structured species.

Also seen in the spectra is the fact that the tetrahedral and octahedral peaks have undergone a rightward or upfield chemical shift. This means that the metal species are experiencing a less electronegative environment. This is probably due to the greater amount of silica-metal interactions taking place which shield the tetrahedral and octahedral species from interacting with negative ions present in the colloidal system such as chlorides, halogens, salt cations, and/or other cations. Also as more of the metal is in the form of tetrahedral and octahedral arrangement, they are not in the form of other alumina species more prone to interactions with cations in the continuous phase. The ratio of measured signals for tetrahedral to octahedral species also changed from 1:3 in the prior art precursor to 1:1 in the modified precursor.

In at least one embodiment an amount of up to, equal, or more than 90% of the metal species in the colloidal system is sufficiently shielded from cations in the colloidal system such that it manifests at least up to or equal to a chemical shift ($\delta$) of at least 5 ppm relative to the prior art precursor.

Figure 4:
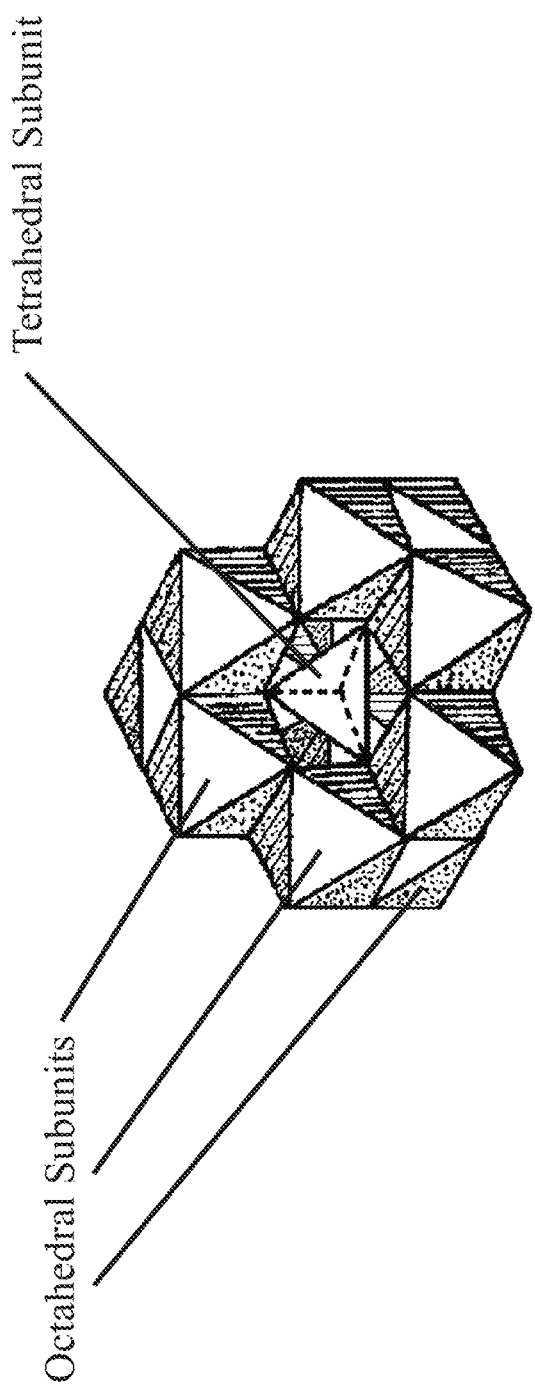
FIG. 4 is an illustration of a Keggin type arrangement containing tetrahedral and octahedral components.

In at least one embodiment an amount of up to, equal, or more than 90% of the metal species in the colloidal system is in the form of a Keggin structure. As described in the article *Studies on the mechanism of hydrolysis and polymerization of aluminum salts in aqueous solution: correlations between the "Core-links" model and "Cage-like" Keggin-$Al_{13}$ model*, by Shuping Bi et al, Coordination Chemistry Reviews, Vol. 248, pp. 441-445 (2004), polynuclear Al can exist in a form comprising an Al core (tetrahedral or octahedral) "caged" by tetrahedral or octahedral Al units. FIG. 4 illustrates such a Keggin structure of a zeolite. Because FIG. 3 makes clear that the modified sols comprise tetrahedral and octahedral units and lack most/all of the other species it appears to be a Keggin structure. In at least one embodiment the Keggin structure comprises 1-40 tetrahedral units and 1-40 octahedral units. In at least one embodiment the metal is aluminum and the Keggin structure is substantially in the form of $Al_{13}O_4(OH)^{3+}_{28}$. In at least one embodiment the metal is aluminum and the Keggin structure is substantially in the form of $[Al_{13}O_4(OH)_{24}(H_2O)_{12}]^{7+}$. In at least one embodiment the metal is aluminum in the form of a Keggin-$Al_{13}$ arrangement. In at least one embodiment there is a single tetrahedral arrangement at the core of the Keggin structure and there are numerous octohedral arrangements surrounding the core.

In at least one embodiment an amount of up to, equal, or more than 90% of the metal species in the colloidal system is in the form of a free standing molecular arrangement. In prior art precursors, a metal salt is mixed with colloidal silica which remains dispersed only in a pH narrow range. The two become mixed by changing the pH and precipitating out a mixture of silica and metal. This however results in the metal precipitate being an agglomeration of multiple molecules. In contrast, with modified precursors, each metal particle is in the form of only 1 or a few molecules which are out of direct contact with the balance of the metal in the colloidal system. In at least one embodiment the molecule is a free standing (relative to other metal particles not to silica because it is in contact with the sol) Keggin structure of metal. In at least one embodiment the molecule is a mass comprising metal which has a cross section smaller than one of: 0.5, 1, 1.5, 2, 2.5, 3, 3.5, 4, 4.5, 5, or 5.5 nm. These masses are in physical contact with the sol either embedded within its bulk or in part or entirely along the sol's surface.

In at least one embodiment the metal assumes a polyoxometalate structure other than a Keggin structure. This includes geometric arrangements which in addition to possibly including tetrahedral and octahedral arrangements may also possibly include those such as one or more of: linear, trigonal planar, tetrahedral, trigonal bipyramidal, octahedral, bent, trigonal pyramidal, see-saw, square pyramidal, T-shaped, square planar, and any combination thereof. In at least one the polyoxometalate structure comprises 1-500 of any one, some, or all of the geometric arrangements. In at least one embodiment the metal component comprises 1-40 tetrahedral units and 1-40 octahedral units but is not a "caged" Keggin structure.

In at least one embodiment the ratio of doped material to silica can be easily controlled by mixing the proper amount of precursors. This ability provides an easy path to make high SAR zeolites. High SAR zeolites are sought for their high thermal stability, acid resistant and enhance catalysis selectivity in petrochemical processes. Nonlimiting examples of SAR ranges easily attainable with the technology include: 18-40 for chabazite and 62.5-600 for beta.

In at least one embodiment an SDA precursor is used. The efficient synthesis of sophisticated zeolite-based compositions often requires the use of SDAs. Preferably, the SDA component is a quaternary amine that forms an alkaline solution when dispersed in water, such as quaternary ammonium hydroxides. In addition, it is further preferred that the quaternary amine includes a tetraalkyl ammonium ion wherein each alkyl group has a carbon chain length of 1 to 10, the alkyl groups being the same or different.

Nonlimiting examples of quaternary amines suitable for use as the stabilizer include one or more of: tetramethylammonium hydroxide (TMAOH), tetrapropylammonium hydroxide (TPAOH), tetraethylammonium hydroxide (TEAOH), 'tetrabutylammonium hydroxide (TBAOH), tetrahexylammonium hydroxide, tetraoctylammonium hydroxide, tributylmethylammonium hydroxide, triethylmethylammonium hydroxide, trimethylphenylammonium hydroxide, methyltripropylammonium hydroxide, dodecyltrimethylammonium hydroxide, hexadecyltrimethylammonium hydroxide, dimethyldodecylethylammonium hydroxide, diethyldimethylammonium hydroxide, the like and any combinations thereof. Also, any combination of the bromide and chloride forms of the above mentioned ammonium salts can be used by passing through a hydroxide (anion)-exchange column to produce the alkylammonium hydroxide materials. Alternatively, the SDA can be eliminated by a careful control of the nucleation kinetics to create hydrogel systems.

In at least one embodiment the precursors include an alkali metal hydroxide and/or an alkaline earth metal hydroxide such as one or more of: the hydroxide of sodium, potassium, lithium, cesium, rubidium, calcium and magnesium.

In at least one embodiment the alkali metal hydroxide is omitted.

In at least one embodiment the nucleation reaction is conducted without an alkali metal hydroxide but under basic conditions (such as with the use of a hydroxide source).

In at least one embodiment the basic conditions are achieved by the use of an SDA which also doubles as a hydroxide source.

In at least one embodiment the modified colloidal silica undergoes heating for a time period of between 1 minute and up to 10 days. For at least a portion of the time the heating is at a temperature of at least 100° F.

In at least one embodiment the resulting zeolite is one or more of: gonnardite, natrolite, mesolite, paranatrolite, scolecite, tetranatrolite, edingtonite, kalborsite, thomsonite, analcime, leucite, pollucite, wairakite, yugawaralite, goosecreekite, montesommaite, harmotome, phillipsite, amicite, gismondine, garronite, gobbinsite, boggsite, merlinoite, mazzite, paulingite, perlialite, chabazite, herschelite, willhendersonite, faujasite, maricopaite, mordenite, offretite, wenkite, bellbergite, bikitaite, erionite, ferrierite, gmelinite, dachiardite, epistilbite, clinoptilolite, heulandite, stilbite, barrerite, stellerite, brewsterite, cowlesite, pentasil, tschernichite, and beta.

In at least one embodiment the precursors are so homogenous that the entirety of the SAR distribution is contained within a volume of no more than 200 nm$^3$. For example all or substantially or essentially all of the colloidal sols are within such a small volume and all of the aluminum, oxygen, and silicon are within those sols so all of the precursors are within such a small volume. In at least one embodiment the precursors are so homogenous that the entirety of the SAR distribution is essentially homogenous at a size of from less than or up to 50 nm$^3$ up to 1000 nm$^3$ or greater.

EXAMPLES

The foregoing may be better understood by reference to the following examples, which are presented for purposes of illustration and are not intended to limit the scope of the invention. In particular the examples demonstrate representative examples of principles innate to the invention and these principles are not strictly limited to the specific condition recited in these examples. As a result it should be understood that the invention encompasses various changes and modifications to the examples described herein and such changes and modifications can be made without departing from the spirit and scope of the invention and without diminishing its intended advantages. It is therefore intended that such changes and modifications be covered by the appended claims.

A number of samples were run involving the conversion of precursors into chabazite or beta type zeolite. For all of the samples the precursors included a silica source and an SDA. The samples had different amounts of SDA and were heated in a reactor for different amounts of time and at different temperatures. The colloidal silica was modified either by incorporating aluminum into the framework or on the surface of the particles.

The crystallinity of the reaction products were measured using a Powder X-ray diffraction (XRD) measurements operating at 45 kV and 40 mA, and using Cu Kα radiation (λ=0.1542 nm). The morphology of the samples was studied by scanning electron microscopy (SEM) using a Hitachi S3000N microscope. Textural properties were determined by N2 adsorption isotherms measured at 77 K with a Quantachrome ASIQWin. The modified precursors all had the NMR spectra of FIG. 3.

The results show that by modifying colloidal silica in the bulk (embedded within the sol/particle) or on the surface of the particles a 90-100% crystalline product could be achieved within a much shorter time period than taught by the prior art. For a particular Al:Si ratio and temperature combination that required 40 hours to achieve substantially 100% crystallinity, the use of coated colloidal silica only required 3 hours and embedded colloidal silica required only 6 hours. Moreover this was achieved using much less molar SDA (0.04 instead of 0.07). Thus it is clear that the use of modified colloidal silica results in vastly faster reaction kinetics. Tables 1 and 2 summarize the results.

TABLE 1

Chabazite Zeolite Nucleation Results

| # | Precursor Arrangement | Crystallization T (° C.)/ t (hrs) | Precursor Type | SDA:Si | Crystallinity % |
|---|---|---|---|---|---|
| 1 | mesoporous agglomeration | 170/40 | Al chlorohydrate bulk modified silica | 0.07 | Chabazite, 38 |
| 2 | dispersed modified colloid | 170/24 | Al chlorohydrate bulk modified silica | 0.04 | Chabazite, 78 |
| 3 | dispersed modified colloid | 170/12 | Al chlorohydrate bulk modified silica | 0.04 | Chabazite, 73 |
| 4 | dispersed modified colloid | 170/6 | Al chlorohydrate bulk modified silica | 0.04 | Chabazite, 71 |
| 5 | dispersed modified colloid | 170/3 | Al chlorohydrate bulk modified silica | 0.04 | Chabazite, 54 |
| 6 | dispersed modified colloid | 170/40 | Al chlorohydrate bulk modified silica | 0.03 | Chabazite, 76 |
| 7 | dispersed modified colloid | 170/40 | Al acetate dibasic bulk modified silica | 0.04 | Chabazite, 65 |
| 8 | dispersed modified colloid | 170/40 | Al Sulfate bulk modified silica | 0.04 | Chabazite, 67 |
| 9 | dispersed modified colloid | 170/40 | Al Lactate bulk modified silica | 0.04 | Chabazite, 63 |
| 10 | dispersed modified colloid | 170/40 | Al chlorohydrate bulk modified silica | 0.04 | Chabazite, 89 |

TABLE 1-continued

Chabazite Zeolite Nucleation Results

| # | Precursor Arrangement | Crystallization T (° C.)/ t (hrs) | Precursor Type | SDA:Si | Crystallinity % |
|---|---|---|---|---|---|
| 11 | dispersed modified colloid | 170/40 | Al acetate surface modified silica | 0.07 | Chabazite, 100 |
| 12 | dispersed modified colloid | 170/20 | Al chlorohydrate surface modified silica | 0.07 | Chabazite, 61 |
| 13 | mesoporous agglomeration | 170/40 | Al chlorohydrate bulk modified silica | 0.04 | Amorphous |

Table 1 demonstrates the superiority of the invention over the mesoporous precursor process described in U.S. Pat. No. 8,658,127. For a given sample of silica modified with Al chlorohydrate and reacted in the presence of an adamantylammonium hydroxide SDA, samples #1 and #13 describe what occurs when these precursors are in the form of the prior art mesoporous agglomeration when the reaction is begun. Sample 13 shows that with a low amount of SDA at 170° C. after 40 hours a zeolite does not form. Sample 1 shows that with a high amount of SDA a low quality (low crystallinity %) chabazite zeolite forms.

In contrast samples 2, 3, 4, 5, and 6 shows that with a modified colloidal precursor sol sample even with a low amount of SDA, a high quality chabazite zeolite forms in an extremely short period of time. Samples 7-12 show that this phenomenon is not exclusive to silica bulk modified with Al chlorohydrate and occurs with other arrangements (surface modified for example) or other aluminum bearing dopants.

TABLE 2

Beta Zeolite Nucleation Results

| Sample # | Crystallization T (° C.)/ t (hrs) | Precursor Type | SDA:Si | Crystallinity % |
|---|---|---|---|---|
| 14 | 140/24 | Al surface modified silica | 0.5 | Beta, 98 |
| 15 | 140/24 | Fumed silica + Al acetate blend | 0.5 | Amorphous |
| 16 | 140/24 | Silicic acid + Al acetate blend | 0.5 | Amorphous |
| 17 | 140/6 | Al surface modified silica | 0.5 | Beta, 77 |
| 18 | 140/3 | Al surface modified silica | 0.5 | Beta, 43 |
| 19 | 140/12 | Al surface modified silica | 0.5 | Beta, 54 |

Table 2 demonstrates that the phenomenon not only applies to the synthesis of the chabazite but also applies to other zeolites such as beta type zeolite. In this case tetraethylammonium SDA was used. Presumably the increase in kinetics and crystallinity of zeolites occurs with all types of SDA and with all modified colloidal silica arrangements. Samples 15 and 16 utilized a mixture bearing silica and dissolved aluminum, but in which the aluminum and silicon did not start out modified within or along the colloidal sols and were instead free floating within the carrier phase with no chemical bond between them. These samples did not form beta zeolite under these conditions. In contrast sample 14 shows that when using a modified precursor under the identical conditions with identical amounts of silica, oxygen, and metal, a 98% beta zeolite forms. Moreover samples 17-19 show that in shorter periods of time beta zeolites also form.

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments mentioned herein, described herein and/or incorporated herein. In addition the invention encompasses any possible combination that also specifically excludes any one or some of the various embodiments mentioned herein, described herein and/or incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range. All percentages, ratios and proportions herein are by weight unless otherwise specified. Unless otherwise indicated herein molecular weight or MW refers to molecular weight as measured by weight average.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method of forming a zeolite, the method comprising: heating a composition of matter to form the zeolite, the composition of matter comprising a structure directing agent and a modified colloidal silica sol, the modified colloidal silica sol comprising tetrahedral and octahedral aluminum species.

2. The method of claim 1, wherein the method comprises heating the composition of matter to a temperature of at least 100° C. for 0.1 hours to 10 hours.

3. The method of claim 1, wherein the silica to alumina ratio is 18 to 40.

4. The method of claim 1, wherein the silica to alumina ratio is 62.5 to 600.

5. The method of claim 1, wherein the method comprises heating for no more than four hours.

6. The method of claim 1, wherein a zeolite is formed having a crystallinity of 75% to 100%.

7. The method of claim 1, wherein a zeolite is formed having a crystallinity greater than 80%.

8. The method of claim 1, wherein a chabazite is formed.

9. The method of claim 1, wherein a beta zeolite is formed.

10. The method of claim 1, wherein a gonnardite, natrolite, mesolite, paranatrolite, scolecite, tetranatrolite, edingtonite, kalborsite, thomsonite, analcime, leucite, pollucite, wairakite, yugawaralite, goosecreekite, montesommaite, harmotome, phillipsite, amicite, gismondine, garronite, gobbinsite, boggsite, merlinoite, mazzite, paulingite, perlialite, herschelite, willhendersonite, faujasite, maricopaite, mordenite, offretite, wenkite, bellbergite, bikitaite, erionite, ferrierite, gmelinite, dachiardite, epistilbite, clinoptilolite, heulandite, stilbite, barrerite, stellerite, brewsterite, cowlesite, pentasil, or tschernichite is formed.

11. The method of claim 1, wherein the structure directing agent is an adamantylammonium hydroxide.

12. The method of claim 1, wherein the structure directing agent is a bromide, chloride, or hydroxide of an ammonium salt wherein the ammonium group is selected from tetramethylammonium, tetrapropylammonium, tetraethylammonium, tetrabutylammonium, tetrahexylammonium, tetraoctylammonium, tributylmethylammonium, triethylmethylammonium, trimethylphenylammonium, methyltripropylammonium, dodecyltrimethylammonium, hexadecyltrimethylammonium, dimethyldodecylethylammonium, diethyldimethylammonium, or a combination thereof.

13. The method of claim 1, wherein a molar ratio of the tetrahedral to octahedral aluminum species is about 1:1.

14. The method of claim 1, wherein the modified colloidal silica sol further comprises a species selected from an alkali metal, an alkaline earth metal, a first row transition metal, a second row transition metal, a lanthanide, and any combination thereof.

15. The method of claim 1, wherein the modified colloidal silica sol further comprises a species selected from cerium, titanium, tin, zirconium, zinc, copper, nickel, molybdenum, iron, rhenium, vanadium, boron, and any combination thereof.

* * * * *